(12) United States Patent
Bhide et al.

(10) Patent No.: US 11,113,643 B2
(45) Date of Patent: Sep. 7, 2021

(54) NOTIFICATION MANAGEMENT TO A GROUP PERFORMING A COMMON TASK

(71) Applicant: International Business Machines Corporation, Armonk, NY (US)

(72) Inventors: Manish Anand Bhide, Hyderabad (IN); Sarbajit K. Rakshit, Kolkata (IN); Madhavi Katari, Hyderabad (IN); Seema Nagar, Bengaluru (IN); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 16/733,429

(22) Filed: Jan. 3, 2020

(65) Prior Publication Data
US 2021/0209540 A1    Jul. 8, 2021

(51) Int. Cl.
*G06Q 10/06* (2012.01)
*H04L 12/58* (2006.01)

(52) U.S. Cl.
CPC .... *G06Q 10/063114* (2013.01); *H04L 51/043* (2013.01); *H04L 51/046* (2013.01); *H04L 51/20* (2013.01); *H04L 51/24* (2013.01)

(58) Field of Classification Search
None
See application file for complete search history.

(56) References Cited

U.S. PATENT DOCUMENTS

| | | | | |
|---|---|---|---|---|
| 5,260,986 A | * | 11/1993 | Pershan | H04M 3/533 340/7.46 |
| 5,765,140 A | * | 6/1998 | Knudson | G06Q 10/063114 705/7.15 |
| 6,381,610 B1 | * | 4/2002 | Gundewar | G06Q 10/06 |
| 7,263,183 B1 | * | 8/2007 | Klein | H04M 7/006 379/265.09 |
| 9,049,105 B1 | * | 6/2015 | Feinstein | H04L 41/069 |
| 9,203,914 B1 | * | 12/2015 | Farago | H04L 67/18 |
| 9,424,102 B2 | * | 8/2016 | Boenisch | G06F 9/4881 |

(Continued)

FOREIGN PATENT DOCUMENTS

KR    100641978 B1    11/2006

*Primary Examiner* — Backhean Tiv
(74) *Attorney, Agent, or Firm* — Yee & Associates, P.C.

(57) ABSTRACT

Managing notifications is provided. Personal monitoring system inputs corresponding to each member of a defined group performing a common task are contextually analyzed to identify a notification sequence for each respective member enabling task performance in a synchronized manner. Progress of each respective member while performing activities corresponding to the common task is analyzed using the personal monitoring system inputs to enable dynamic modification of the notification sequence and content to the members in accordance with the progress. Existence of any problem is identified during performance of activities corresponding to the common task to accordingly modify the notification sequence and content to target members for mitigation of an existing problem. Alignment of one or more members with a completion timeline for a given activity corresponding to the common task is identified for automatic notification suppression of a planned notification upon completion of the given activity within the completion timeline.

20 Claims, 6 Drawing Sheets

(56) References Cited

U.S. PATENT DOCUMENTS

| | | | |
|---|---|---|---|
| 9,866,464 B1* | 1/2018 | Miltenberger | H04L 51/24 |
| 10,163,358 B2* | 12/2018 | Yadav | G06Q 10/109 |
| 10,425,452 B2* | 9/2019 | Paul | H04L 41/0853 |
| 2002/0078007 A1* | 6/2002 | Herrero | G06Q 10/10 |
| 2002/0113803 A1* | 8/2002 | Samra | G11B 27/034 |
| | | | 345/619 |
| 2002/0120480 A1* | 8/2002 | Kroeger | G06Q 10/063 |
| | | | 705/7.26 |
| 2003/0046134 A1* | 3/2003 | Frolick | G06Q 10/1097 |
| | | | 705/7.17 |
| 2003/0061330 A1* | 3/2003 | Frisco | H04L 51/24 |
| | | | 709/223 |
| 2003/0078826 A1* | 4/2003 | Swanke | G06Q 10/063118 |
| | | | 705/7.15 |
| 2003/0106039 A1* | 6/2003 | Rosnow | G06Q 10/06 |
| | | | 717/100 |
| 2006/0069599 A1* | 3/2006 | Hatoun | G06Q 10/0633 |
| | | | 705/7.27 |
| 2006/0085245 A1* | 4/2006 | Takatsuka | G06Q 10/0631 |
| | | | 705/7.12 |
| 2007/0174101 A1* | 7/2007 | Li | G06Q 10/063 |
| | | | 705/7.26 |
| 2007/0226032 A1* | 9/2007 | White | G06Q 10/101 |
| | | | 705/300 |
| 2007/0300174 A1* | 12/2007 | Macbeth | G06Q 10/10 |
| | | | 715/772 |
| 2008/0103871 A1* | 5/2008 | Ruehl | G06Q 10/0635 |
| | | | 705/7.15 |
| 2008/0114628 A1* | 5/2008 | Johnson | G06Q 10/06311 |
| | | | 707/792 |
| 2008/0209417 A1* | 8/2008 | Jakobson | G06F 9/4856 |
| | | | 718/100 |
| 2009/0222299 A1* | 9/2009 | Clemenson | G06Q 10/06 |
| | | | 705/7.17 |
| 2009/0235182 A1* | 9/2009 | Kagawa | G06F 16/954 |
| | | | 715/753 |
| 2009/0265430 A1* | 10/2009 | Bechtel | H04L 12/1813 |
| | | | 709/205 |
| 2010/0257526 A1* | 10/2010 | Zimmet | G06Q 10/109 |
| | | | 718/100 |
| 2010/0325207 A1* | 12/2010 | Churchill | H04L 51/14 |
| | | | 709/204 |
| 2011/0258125 A1* | 10/2011 | Iyer | G06Q 10/103 |
| | | | 705/301 |
| 2011/0313803 A1* | 12/2011 | Friend | G06Q 10/109 |
| | | | 705/7.13 |
| 2012/0215578 A1* | 8/2012 | Swierz, III | G06Q 50/205 |
| | | | 705/7.14 |
| 2014/0208325 A1* | 7/2014 | Chen | G06Q 10/107 |
| | | | 718/102 |
| 2014/0288987 A1* | 9/2014 | Liu | G06Q 10/063114 |
| | | | 705/7.15 |
| 2014/0372525 A1* | 12/2014 | Raghavan | H04L 67/18 |
| | | | 709/204 |
| 2015/0229648 A1* | 8/2015 | Avery | G06F 21/6218 |
| | | | 726/30 |
| 2015/0248734 A1* | 9/2015 | Shah | G06Q 10/063114 |
| | | | 705/7.15 |
| 2016/0140501 A1* | 5/2016 | Figlin | G06Q 10/103 |
| | | | 705/7.15 |
| 2016/0316031 A1* | 10/2016 | Diem | H04W 4/80 |
| 2017/0236209 A1* | 8/2017 | Huang | G06Q 40/08 |
| | | | 705/4 |
| 2019/0057339 A1* | 2/2019 | Ponnusamy | G06Q 10/063114 |
| 2019/0356499 A1* | 11/2019 | Demonsant | H04L 51/046 |
| 2020/0007487 A1* | 1/2020 | Chao | G06F 40/169 |
| 2020/0394588 A1* | 12/2020 | Sanchez | G06F 8/75 |
| 2020/0396230 A1* | 12/2020 | Liu | H04L 63/1416 |

\* cited by examiner

FIG. 5

NOTIFICATION MANAGEMENT TO A GROUP PERFORMING A COMMON TASK

BACKGROUND

1. Field

The disclosure relates generally to notification management and more specifically to managing notifications to a group of members performing a common task comprising multiple activities that are to be performed by different members of the group.

2. Description of the Related Art

Notification management ensures delivery of information to the right person, as soon as certain events or conditions occur without requiring user action. For example, notifications may allow all members of a work group to know what's going on regarding projects, upcoming meetings, or anything else members may want to know about. These notifications allow members of the work group to stay on top of current issues and responsibilities.

SUMMARY

According to one illustrative embodiment, a computer-implemented method for managing group member notifications is provided. A computer contextually analyzes personal monitoring system inputs corresponding to each member of a defined group of members performing a common task to identify a notification sequence for each respective member of the defined group of members enabling performance of the common task by the members in a synchronized manner. The computer analyzes progress of each respective member of the defined group of members while performing activities corresponding to the common task using the personal monitoring system inputs to enable dynamic modification of the notification sequence and content of notifications to the members in accordance with the analyzed progress. The computer identifies existence of any problem during performance of the activities corresponding to the common task to accordingly modify the notification sequence and the content of notifications to a set of target members in the defined group of members for mitigation of an existing problem. The computer identifies alignment of one or more members in the defined group of members with a completion timeline for a given activity corresponding to the common task for automatic notification suppression of a planned notification upon completion of the given activity within the completion timeline. According to other illustrative embodiments, a computer system and computer program product for managing group member notifications are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
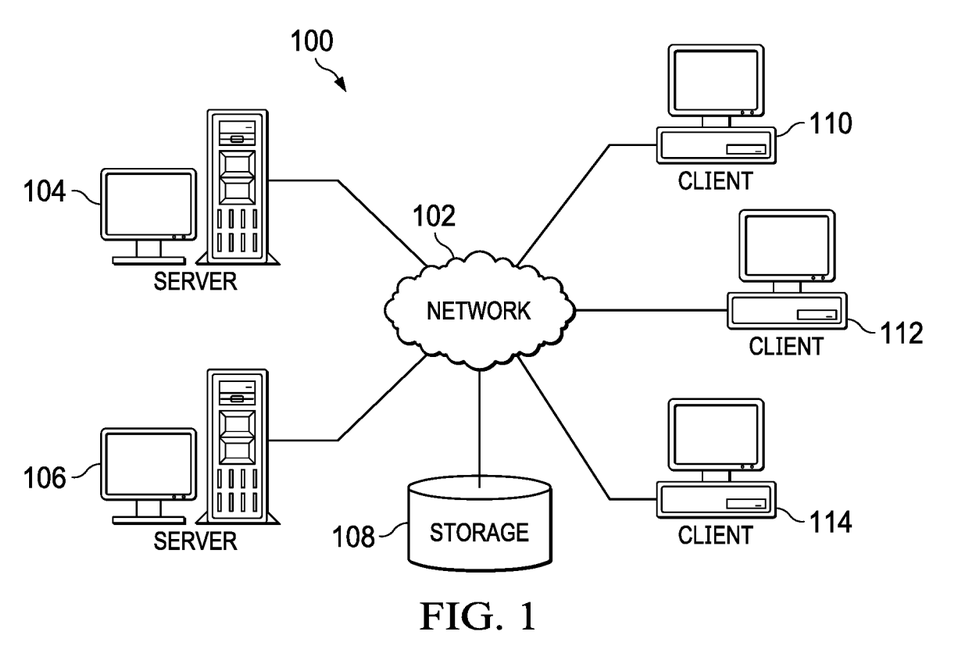
FIG. 1 is a pictorial representation of a network of data processing systems in which illustrative embodiments may be implemented.
Figure 2:
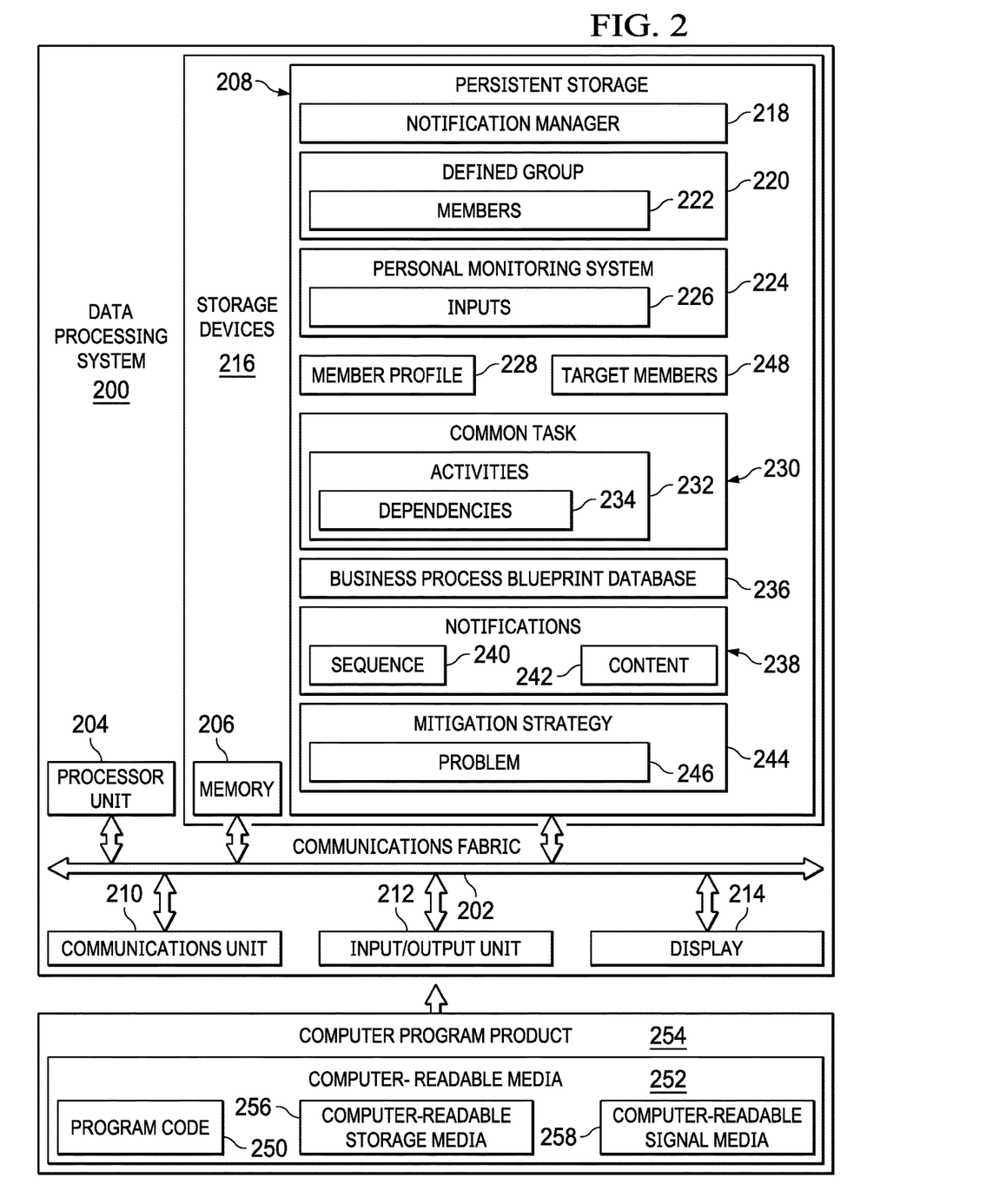
FIG. 2 is a diagram of a data processing system in which illustrative embodiments may be implemented.
Figure 3:
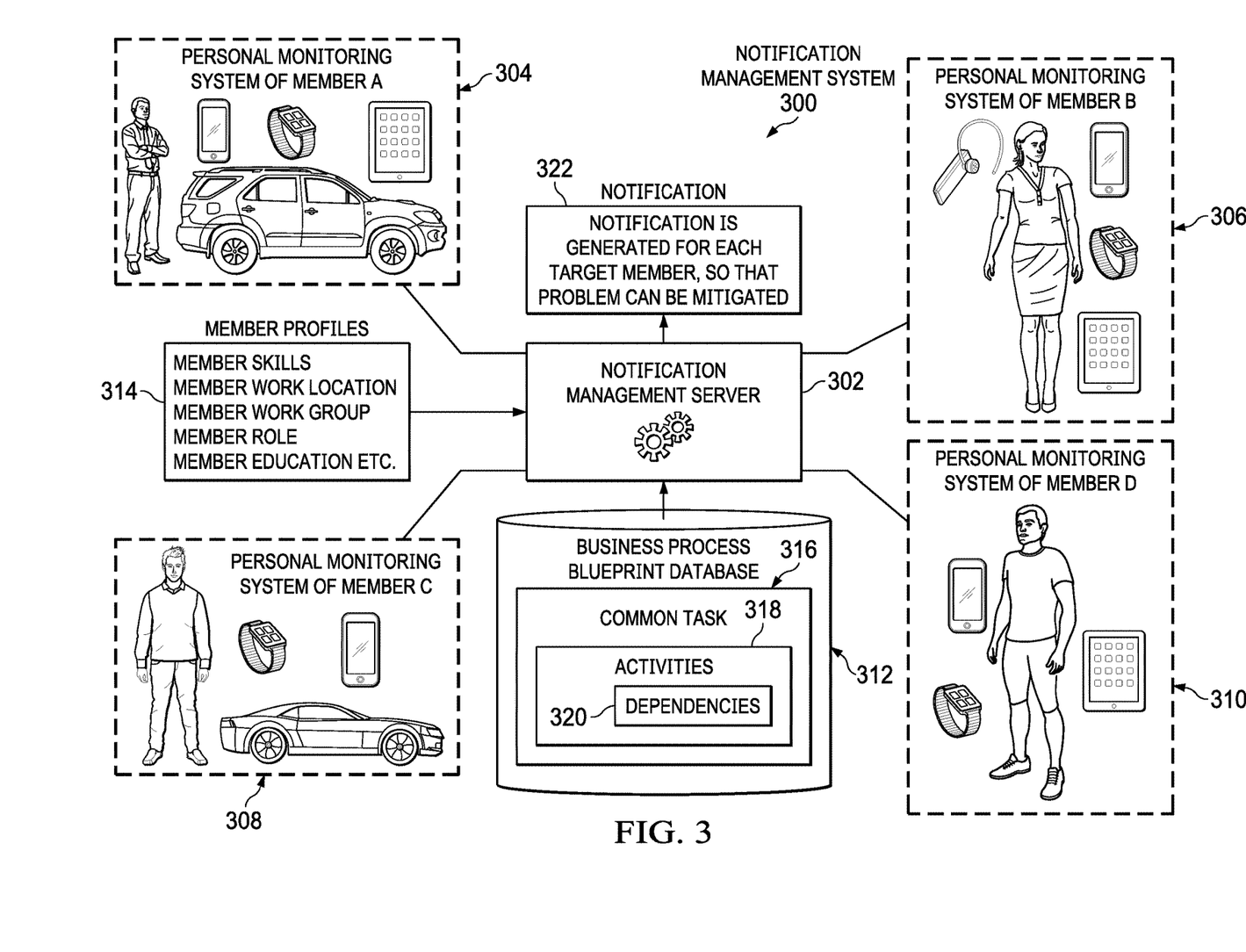
FIG. 3 is a diagram illustrating an example of a notification management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide notification management services to client device users. For example, server 104 and server 106 may manage notifications sent via network 102 to each member of a defined group of members performing a common task comprising a plurality of activities, where different activities are performed by different members of the defined group. Also, it should be noted that server 104 and server 106 may represent one or more clusters of servers in one or more data centers. Alternatively, server 104 and server 106 may represent computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart watches, smart televisions, gaming devices, and the like, with wire or wireless communication links to network 102. Members of the defined group of members may utilize clients 110, 112, and 114 to access the notification management services provided by server 104 and server 106 and receive notification messages.

Storage 108 is a network storage device capable of storing any type of data in a structured format or an unstructured format. For example, storage 108 may store a business process blueprint database. A business process blueprint database may list all activities and processes associated with one or more tasks. A task may be any type of business task, such as, for example, completing a work project, planning business trip, implementing a new sales promotion, developing software, and the like. In addition, the business process blueprint database may list sequence of activities of a given task, descriptions of the activities, dependencies between activities, timeline for activities (e.g., specified begin and end dates), and the like. Also, it should be noted that storage 108 may represent a plurality of network storage devices storing a plurality of different information utilized by server 104 and server 106.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores notification manager 218. However, it should be noted that even though notification manager 218 is illustrated as residing in persistent storage 208, in an alternative illustrative embodiment notification manager 218 may be a separate component of data processing system 200. For example, notification manager 218 may be a hardware component coupled to communication fabric 202 or a combination of hardware and software components. In another alternative illustrative embodiment, a first set of components of notification manager 218 may be located in data processing system 200 and a second set of components of notification manager 218 may be located in a second data processing system, such as, for example, server 106 in FIG. 1.

Notification manager 218 controls the process of managing notifications to a defined group of members performing a common task comprising multiple activities that are to be performed by different members of the defined group to synchronize activity performance of the different members. Defined group 220 identifies a specific group of members that will be performing a common task together. Defined group 220 may include any number of members, such as two, three, four, five, ten, twenty, or the like. Members 222 represent unique identifiers, such as name and identification numbers, for each respective member of defined group 220 that will be performing a particular set of activities corresponding to the common task.

Personal monitoring system 224 identifies a set of devices that monitor activities and actions of a given member of members 222 in defined group 220. It should be noted that each respective member of members 222 has a corresponding personal monitoring system 224. Personal monitoring system 224 comprises a plurality of personal monitoring devices, such as, for example, one or more image capturing devices, sound capturing devices, Internet of Things (IoT) devices, wearable devices, home security devices, sensors, and the like. The plurality of personal monitoring devices comprising personal monitoring system 224 generates inputs 226, which are received by data processing system 200 via a network, such as network 102 in FIG. 1.

Member profile 228 represents information corresponding to a given member of members 222 in defined group 220. It should be noted that each respective member of members 222 has a corresponding member profile 228. Member profile 228 may include information, such as, for example, name and identification number of the given member, skills of the given member, work location of the given member, work group or groups associated with the given member, role of the given member, project history of the given member, education of the given member, expertise of the given member, awards of the given member, list of devices associated with the given member, and the like.

Common task 230 identifies the common task or goal that members 222 of defined group 220 are to achieve together as a group. Common task 230 may represent any type of task, project, job, assignment, or the like. Common task 230 is comprised of activities 232. Activities 232 represent a set of two or more activities, steps, actions, or the like that are to be performed by members 222 of defined group 220 to accomplish common task 230. It should be noted that different members of members 222 are to perform different activities in activities 232. In this example, activities 232 include dependencies 234. Dependencies 234 represent one or more dependencies between two or more activities in activities 232. In other words, one activity may need to be performed by one member prior to another activity being performed by another member in a sequence of activities. However, it should be noted that activities 232 do not have to include any dependencies. Notification manager 218 may determine the sequence of activities in activities 232 and dependencies 234 based on information contained in business process blueprint database 236 or based on historical learning by artificial intelligence components of notification manager 218.

Notification manager 218 generates notifications 238 based on activities 232 and dependencies 234 of common task 230 and inputs 226 of personal monitoring system 224 corresponding to each respective member of members 222 in defined group 220. Notifications 238 include sequence 240 and content 242. Sequence 240 of notifications 238 coincides with sequence of activities 232 and dependencies 234 of common task 230. Content 242 of notifications 238 represents the subject, substance, and text of a given notification and is based on inputs 226 of personal monitoring system 224 corresponding to members 222 in defined group 220.

Mitigation strategy 244 corresponds to problem 246. Problem 246 represents a set of one or more problems or issues encountered by one or more of members 222 while performing one or more of activities 232 of common task 230. Mitigation strategy 244 is a plan to eliminate problem 246 or reduce the effect of problem 246 on completing common task 230 on time. Mitigation strategy 244 may be, for example, to reassign an activity corresponding to problem 246 to another member in members 222, recommend that another member assist the member currently performing the activity corresponding to problem 246, or the like. Notification manager 218 generates mitigation strategy 244 based on information in member profile 228 and inputs 226 from personal monitoring system 224.

Notification manager 218 also identifies target members 248 to receive notifications containing mitigation strategy 244. Target members 248 may be all of members 222 or only a portion of members 222. For example, notification manager 218 may send the notifications containing mitigation strategy 244 only to those members involved with mitigation strategy 244 and not to remaining members of members 222.

As a result, data processing system 200 operates as a special purpose computer system in which notification manager 218 in data processing system 200 enables notification management among group members performing a common task so that task activities performed by the group members are synchronized. In particular, notification manager 218 transforms data processing system 200 into a special purpose computer system as compared to currently available general computer systems that do not have notification manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 250 is located in a functional form on computer readable media 252 that is selectively removable and may be loaded onto or transferred to data processing system 200 for running by processor unit 204. Program code 250 and computer readable media 252 form computer program product 254. In one example, computer readable media 252 may be computer readable storage media 256 or computer readable signal media 258. Computer readable storage media 256 may include, for example, an optical or magnetic disc that is inserted or placed into a drive or other device that is part of persistent storage 208 for transfer onto a storage device, such as a hard drive, that is part of persistent storage 208. Computer readable storage media 256 also may take the form of a persistent storage, such as a hard drive, a thumb drive, or a flash memory that is connected to data processing system 200. In some instances, computer readable storage media 256 may not be removable from data processing system 200.

Alternatively, program code 250 may be transferred to data processing system 200 using computer readable signal media 258. Computer readable signal media 258 may be, for example, a propagated data signal containing program code 250. For example, computer readable signal media 258 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 250 may be downloaded over a network to persistent storage 208 from another device or data processing system through computer readable signal media 258 for use within data processing system 200. For instance, program code stored in a computer readable storage media in a data processing system may be downloaded over a network from the data processing system to data processing system 200. The data processing system providing program code 250 may be a server computer, a client computer, or some other device capable of storing and transmitting program code 250.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code.

As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 256 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Notifications are generally set and delivered to provide a reminder, alert, or recommendation to a user. For example, a notification can be used to remind a user when a meeting is starting or alert the user when the user is performing an activity incorrectly and recommend the correct way to perform the activity. The user can set the notification with appropriate timing or the notification can be event-based. Specifically, in the world of processes where a user needs to carry out a set of activities in order to perform a task, a notification system can provide the user with a series of notifications at different times and stages of the task so that the user is sufficiently reminded and guided to carry out each activity at the right time to accomplish the task.

However, this notification process becomes much more complex when the task needs to be performed by a group of people needing to coordinate activities among themselves. For example, when multiple people of a group are to perform different activities corresponding to the task, notifications need to be sent to each individual of the group and the timing of these notifications needs to be synchronized and delivered to an appropriate device of each respective individual. In another scenario, as individuals are working in a group to accomplish the same task, a first individual may have a dependency on a second individual in that group in accomplishing the first individual's set of activities corresponding to the task. As a result, a notification dependency may exist for alerting the second individual as to the first individual's need for the second individual to accomplish the second individual's set of activities corresponding to the task prior to the first individual starting the first individual's set of activities.

Consequently, one or more issues may arise when managing notifications to every individual of a group performing a common task that has multiple interdependences. Illustrative embodiments provide notification management to every member in a defined group of members performing a common task or goal. Illustrative embodiments manage notifications by organizing, reprioritizing, rescheduling, suppressing, and modifying member notifications based on various constraints associated with other member notifications in that defined group of members. One objective of illustrative embodiments is to synchronize the different activities of the members of the defined group to increase task performance and efficiency by the members.

Illustrative embodiments contextually analyze personal monitoring system inputs corresponding to each individual member of the defined group of members performing the common task to identify an appropriate notification sequence for each respective member of the defined group so that members of the defined group can perform the common task in a synchronized manner. A personal monitoring system of a group member may comprise, for example, a plurality of different components, such as IoT devices (e.g., desktop computer, laptop, handheld computer, smart phone, smart vehicle, smart appliances, and the like), wearable devices (e.g., smart watch, smart glasses, smart ring, activity monitor, heart rate monitor, blood pressure monitor, eye movement monitor, and the like), image capturing devices (e.g., cameras), audio capturing devices (e.g., microphones), home monitoring units (e.g., smart door lock, smart door bell, smart lighting, smart thermostat, motion detectors, sound detectors, and the like), and the like. Each different component has a unique global identifier, such as, for example, a Uniform Resource Identifier.

When multiple group members are collaboratively performing activities to accomplish the common task, illustrative embodiments utilize the inputs from the personal monitoring system of each member of the group to track how each member is performing assigned activities. Moreover, illustrative embodiments may utilize artificial intelligence-based application software for member identification, relationship identification, activity identification, object identification, problem identification, and the like. If illustrative embodiments identify a problem with performance of an activity, then illustrative embodiments generate appropriate mitigation notifications (e.g., activity reassignment, request for activity assistance, and the like) and send the mitigation notifications to one or more target members (e.g., member experiencing the problem, member to assist with problem, member reassigned to activity, and the like) so that activity workflow is maintained and the problem is mitigated. Further, if the target members do not take appropriate action within a preset time after receiving the notification, then illustrative embodiments generate and deliver a reminder notification to the target members.

For example, when a problem exists in the task progress/completion by a particular group member within a time period for rectifying the problem by that particular group member, illustrative embodiments notify that particular group member regarding the problem. However, once the time period for rectifying the problem by that particular group member has past, illustrative embodiments notify one or more other group members that certain activities for accomplishing the task are going to be missed and possibly include corrective action steps in the notification. For example, illustrative embodiments may indicate in the notification to the other group members that "corrective action needs to be taken to correct the problem", even if illustrative embodiments do not know what the corrective action is exactly. Alternatively, if illustrative embodiments have existing prior knowledge regarding this task or similar tasks, then illustrative embodiments may indicate to the other group members that "this is the corrective action that needs to be taken to rectify the problem". Further, illustrative embodiments may notify the particular member causing the problem that such a notification has been sent to the other group members or may suppress all further notifications to that particular group member regarding the particular problem.

Illustrative embodiments analyze personal monitoring system inputs corresponding to each member of the defined group and accordingly reorganize, reprioritize, reschedule, and/or modify one or more notifications so that the members can synchronize with each other and take proper mitigation steps to resolve an existing problem. For example, illustrative embodiments analyze the progress of each respective member of the group while performing the activities of the common task using the personal monitoring system inputs and accordingly dynamically modify timing and content of notifications so that members can perform the activities in a synchronized manner. Furthermore, if illustrative embodiments identify that one or more members of the group are aligned with a completion timeline for an activity, then illustrative embodiments may automatically suppress or remove a planned notification so that the one or more members aligned with the completion timeline are not distracted by the planned notification or confused by a repeat notification. In other words, no notification is sent at that time. As a result, illustrative embodiments decrease network traffic by suppressing planned notifications.

As an example use case scenario, members A, B, C, and D of a defined group of members are travelling to a particular geographic location. Members A, B, C, and D will be starting the trip from different locations. Members A, B, C, and D may travel in the same vehicle or may travel in different vehicles. It should be noted that illustrative embodiments work in either situation.

In this example, member A is the first person to start traveling. Member A is supposed to bring bottles of water for the trip, which illustrative embodiments identified as an activity for member A based on inputs from a personal monitoring system corresponding to each respective member A, B, C, and D when members A, B, C, and D were deciding who would bring what for the trip (i.e., the common task). Illustrative embodiments recorded this identified activity in a backend server (e.g., a notification management server) and performed a deduplication of personal monitoring system inputs to avoid duplicate activity records.

However, member A has not enabled the notification management of illustrative embodiments on member A's home computer, but has enabled notification management in member A's smart vehicle, which is part of member A's personal monitoring system. Member A is now in member A's smart vehicle. Member A's smart vehicle identifies member A and establishes a connection with the backend server. Illustrative embodiments identify that member A has forgotten to bring the water bottles based on comparing objects detected by sensors within member A's smart vehicle with the activity record corresponding to member A for the trip stored in the backend server. Also, it should be noted that illustrative embodiments could not send a water bottle reminder notification to member A at home prior to starting the trip because member A did not enable notification management on member A's home computer.

Illustrative embodiments then send notifications to members B, C, and D so that members B, C, and D can arrange to bring the bottles of water since member A forgot. However, members B, C, and D may have manually created self-reminder notifications for reminding member A before starting the trip to bring the bottles of water. As member A has already forgotten to bring the bottles of water and member A started 30 minutes ahead of schedule, there is no point in illustrative embodiments showing the manually created self-reminder notifications to members B, C, or D anymore. Consequently, illustrative embodiments suppress the manually created self-reminder notifications.

Member A is now experiencing a problem with member A's smart vehicle. As a result, illustrative embodiments automatically generate and send notifications to members B, C, and D recommending that members B, C, and D wait for member A. Illustrative embodiments determined that member A was having a problem with the vehicle based on inputs obtained from the personal monitoring system corresponding to member A and generated the priority notifications for members B, C, and D. If repairs to member A's smart vehicle take longer than expected, then illustrative embodiments may renotify members B, C, and D regarding the delay.

An example workflow of illustrative embodiments is as follows. Illustrative embodiments identify each member of a defined group of members who will be performing a set of activities together to accomplish a common task. The common task may be any type of task that consists of different activities. In addition, illustrative embodiments identify a set of devices corresponding to each member where notifications can be received by a particular member. In other words, each member can receive notifications on one device or on multiple devices simultaneously. The set of devices may be included in the personal monitoring system of a group member or may be a separate set of communication devices.

When a member is performing a set of activities corresponding to the common task, illustrative embodiments identify the set of activities that the member is performing, the geographic location of the set of activities, and any associated details regarding the set of activities, such as, for example, expected performance quality and timing corresponding to the set of activities, objects needed, and the like. Illustrative embodiments identify this set of activities (e.g., steps of a process) based on information contained in a business process blueprint database that is accessible by the backend server. When illustrative embodiments generate a notification, illustrative embodiments can show the notification on a particular set of member devices at the scheduled time and location or based on occurrence of an event.

In addition, illustrative embodiments identify a sequence of the set of activities corresponding to the common task, how one activity is related to (i.e., dependent on) another activity, and the like, based on the information contained in the business process blueprint database. Alternatively, illustrative embodiments may identify the sequence of the set of activities using historical activity sequence learning provided by the artificial intelligence components of illustrative embodiments.

Illustrative embodiments continuously track ongoing member activities and validate the activities with timing (e.g., whether or not the activities are running on schedule), activity performance quality, and the like. If illustrative embodiments identify that the activities are not being performed properly or that a problem exists, then illustrative embodiments invite the personal monitoring systems of the group members to share data with each other via the backend server. Using this shared data, illustrative embodiments generate a mitigation strategy to resolve the poor performance or problem as a set of reorganized, reprioritized, rescheduled, suppressed, and/or modified activities, along with corresponding notifications. While generating the mitigation strategy, illustrative embodiments take into account member information, such as, for example, specific skills of the members, security level of the members, work locations of the members, work experience of the members, education of the members, and the like, that is stored in profiles corresponding to the group members.

After generating the mitigation strategy notifications, illustrative embodiments select one or more target members to deliver the mitigation strategy notifications to. The target members may be, for example, a member that is to perform an activity that has a dependency on another activity that needs to be performed by another member, members that have a concurrently shared activity, or the like. If illustrative embodiments, using the personal monitoring system inputs corresponding to a given target member, identify that the given target member is already performing the activity, then illustrative embodiments suppress the notification for the given target member in order to avoid creating a distraction. If illustrative embodiments determine that the given target member is not performing the activity, then illustrative embodiments renotify the given target member so that the given target member can perform the activity in a timely fashion.

Illustrative embodiments perform a plan-of-activity detection and notification setting process. Using audio and video inputs corresponding to group members, illustrative embodiments detect objects, activities, locations, and times being discussed by members. Illustrative embodiments are also capable of detecting voice tone excitement and utilize a voice tone excitement threshold to determine whether voice tone excitement of the members is sufficiently high for a threshold number of members. If sufficient excitement is present in member tones and if the times being discussed include a threshold number of objects and/or activities at a specific location, then illustrative embodiments mark this as a plan-of-activity.

For each individual member, illustrative embodiments resolve the activities and objects to be associated with each individual member at specified times. Illustrative embodiments generate a record in the backend server for these activities and objects against the individual members at the specified times. In addition, illustrative embodiments set reminder notifications regarding the activities and objects sufficiently in advance for each individual member. Further, illustrative embodiments may set reminder notifications to other members of the group for reminding an individual member or set reminder notifications for the other members in case the individual member does not perform the activity at the specified time and location for the activity.

If the activity is a known activity (e.g., an activity that this group or another group had performed previously), then illustrative embodiments retrieve other instances of this activity corresponding to this group or the other group. Illustrative embodiments also check for objects associated with the activity and notify the group members for any missing objects, asking if the group members missed an object by mistake. Illustrative embodiments add any missing object if a threshold number of group members indicate that an object was missed by mistake. Accordingly, illustrative embodiments set notifications for each missing object and mark members, locations, and times for this instance.

Furthermore, illustrative embodiments also perform a start-of-activity detection and notification delivery process. Using inputs from each independent personal monitoring system (each personal monitoring system being associated with a particular group member uniquely), illustrative embodiments check for an activity being performed by a respective group member on each object and also check the time and location. If illustrative embodiments find an activity record against this group member for this time and location within permissible thresholds, but not with the object, then illustrative embodiments send a notification to the group member reminding of the activity. If illustrative embodiments have notified the group member earlier, but the group member has not responded to the notification within a threshold time period, illustrative embodiments renotify the group member. Alternatively, if the group member has already performed the activity within the threshold time period, then illustrative embodiments suppress or remove the renotification because the group member has already performed the activity.

If illustrative embodiments find an activity record against this group member for this time, but if the current location of the group member is different, then illustrative embodiments send a notification to the group member and check whether the group member has missed the activity or intends to perform the activity within the threshold time period. If the group member intends to complete the activity within the threshold time period, then illustrative embodiments suppress notification to other group members for a defined time period until this check is repeated. Alternatively, if the group member does not intend to complete the activity within the threshold time period, then illustrative embodiments send notifications to the other group members regarding the group member missing of the activity so that the other group members can take remedial actions if necessary.

Thus, illustrative embodiments utilize inputs from personal monitoring systems, which may include, for example, IoT devices, wearable devices, image capturing devices, audio capturing devices, home monitoring units, and the like, corresponding to members of a defined group of members to organize, re-prioritize, reschedule, suppress, and modify notifications to individual members of the defined group, who are performing a set of activities to accomplish a common task, so that activity of the defined group can be performed by members in a synchronized manner with a best possible group-level outcome. As a result, illustrative embodiments increase task performance.

Consequently, illustrative embodiments provide one or more technical solutions that overcome a technical problem with synchronizing different activities of different group members performing a common task using electronic notifications sent via a network from a notification management computer. As a result, these one or more technical solutions provide a technical effect and practical application in the field of electronic notification management and network communications.

With reference now to FIG. 3, a diagram illustrating an example of a notification management system is depicted in accordance with an illustrative embodiment. Notification management system 300 may be implemented in a network of data processing systems, such as network data processing system 100 in FIG. 1. Notification management system 300 is a system of hardware and software components for managing notifications to a group of members (e.g., member A, member B, member C, and member D) performing a common task comprising multiple activities that are to be performed by different members of the group. For example, the common task may comprise six different activities and member A is to perform activities one and six, member B is to perform activity two, member C is to perform activities three and four, and member D is to perform activities five and six. It should be noted that member A and member D are to perform activity six together.

In this example, notification management system 300 includes notification management server 302, personal monitoring system of member A 304, personal monitoring system of member B 306, personal monitoring system of member C 308, personal monitoring system of member D 310, business process blueprint database 312, and member profiles 314. Notification management server 302 may be, for example, server 104 in FIG. 1 or data processing system 200 in FIG. 2. Notification management server 302 receives inputs from personal monitoring system of member A 304, personal monitoring system of member B 306, personal monitoring system of member C 308, and personal monitoring system of member D 310 and analyzes these inputs together to manage and synchronize performance of activities 318 of common task 316 by member A, member B, member C, and member D.

Common task 316 may be, for example, a task that was previously completed by members A, B, C, and D or may be a task previously completed by a different defined group of members and stored in business process blueprint database 312 for reference by notification management server 302. Activities 318 represents a set of two or more activities that must be performed by group members to accomplish common task 316. It should be noted that some or all of activities 318 may be performed concurrently or in a particular sequence as defined by dependencies 320 between two or more of activities 318.

Further, it should be noted that personal monitoring system of member A 304, personal monitoring system of member B 306, personal monitoring system of member C 308, and personal monitoring system of member D 310 each contain a different combination of devices. The devices may include, for example, computers, smart vehicles, smart phones, smart watches, smart appliances, wearables, sensors, cameras, microphones, global positioning system transceivers, navigation systems, home security systems, and the like.

Notification management system 300 analyzes the inputs from the different devices of personal monitoring system of member A 304, personal monitoring system of member B 306, personal monitoring system of member C 308, and personal monitoring system of member D 310 to determine performance of activities 318, quality of performance of these activities, and timing of performance of these activities. Notification management system 300 further analyzes the inputs to determine whether a problem exists during performance or expected performance of activities 318. A problem may be, for example, a member failing to timely start an activity, failing to timely finish an activity, failing to obtain an object or item needed to perform an activity, failing to be at a specified location at a specified time to perform an activity, or the like.

If notification management system 300, while analyzing the personal monitoring system inputs, determines that a problem does exist, then notification management system 300 generates a mitigation strategy to resolve the problem based on information in member profiles 314. The information in a member profile may include, for example, member name and identifier, member skills, member work location, member work group, member role, member education, member security level, member resource access level, member area of expertise, list of prior projects and tasks, and the like. After generating the mitigation strategy, notification management system 300 generates and displays notification 322, which contains the mitigation strategy, to a set of one or more target members, such as member A and member C, so that the problem can be mitigated.

Figure 4A:
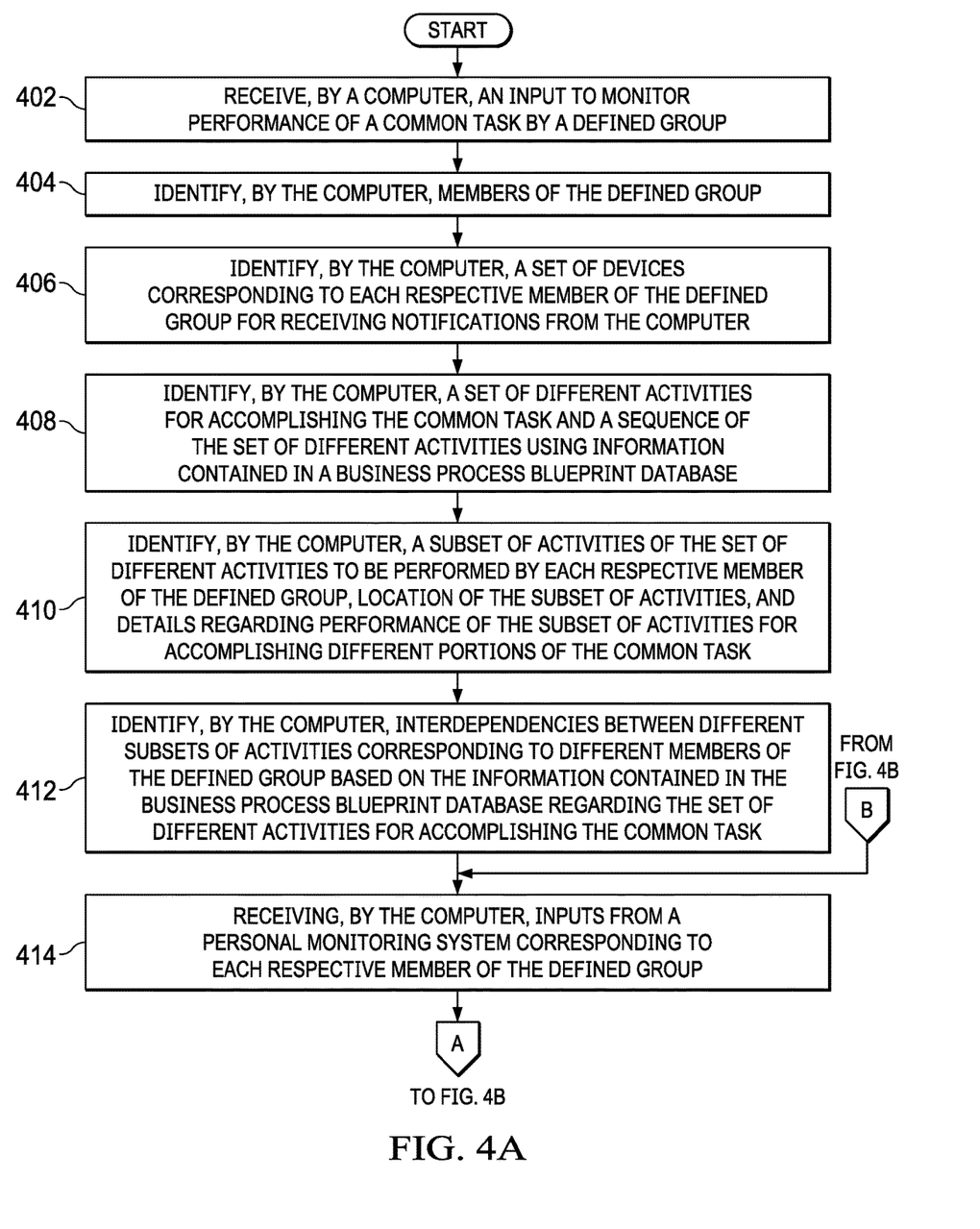
FIGS. 4A-4B are a flowchart illustrating a process for monitoring task performance in accordance with an illustrative embodiment.
Figure 4B:
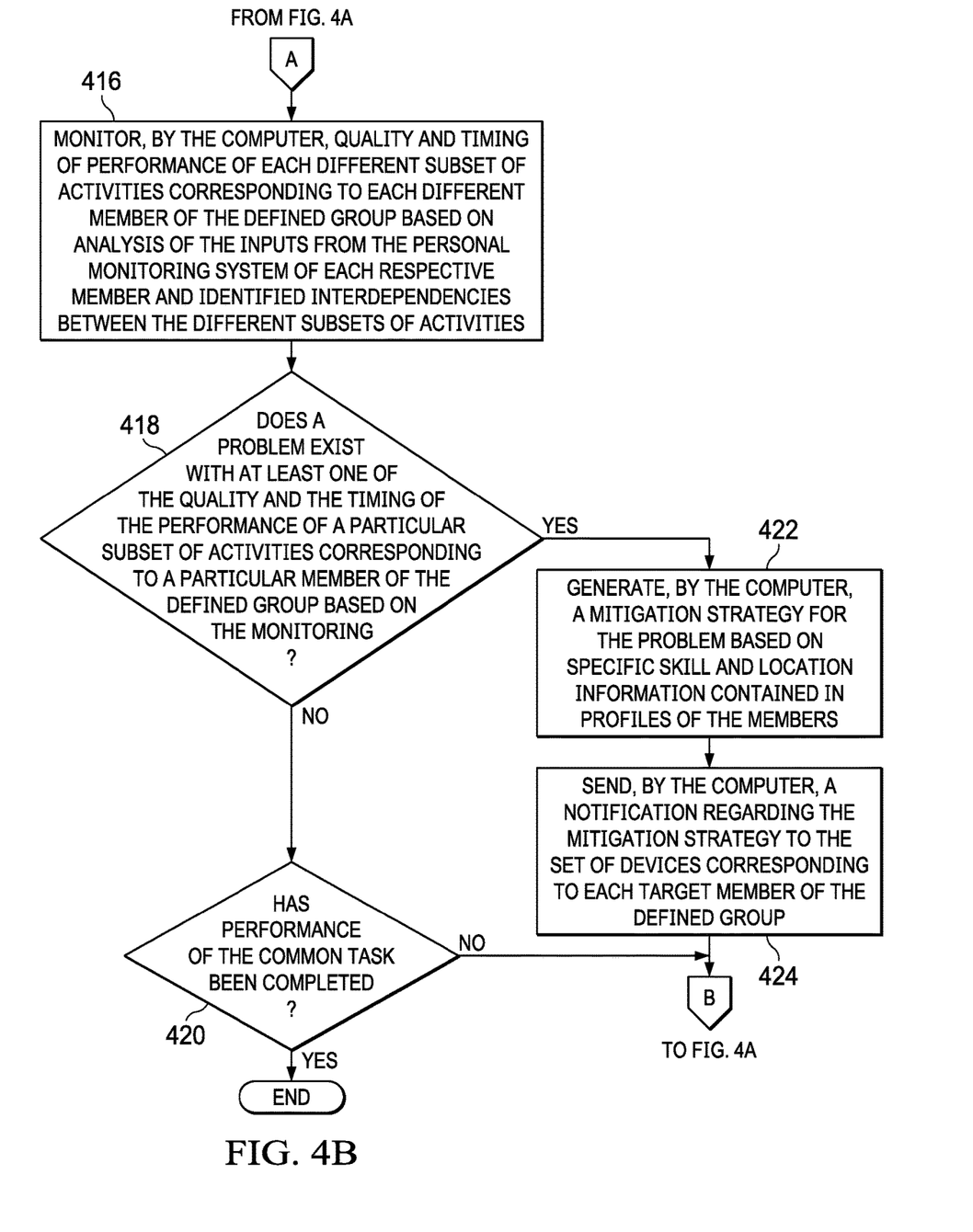

With reference now to FIGS. 4A-4B, a flowchart illustrating a process for monitoring task performance is shown in accordance with an illustrative embodiment. The process shown in FIGS. 4A-4B may be implemented in a computer, such as, for example, server 104 in FIG. 1, data processing system 200 in FIG. 2, or notification management server 302 in FIG. 3.

The process begins when the computer receives an input to monitor performance of a common task by a defined group of members (step 402). The computer identifies members of the defined group (step 404). In addition, the computer identifies a set of one or more devices corresponding to each respective member of the defined group for receiving notifications from the computer (step 406).

Further, the computer identifies a set of different activities for accomplishing the common task and a sequence of the set of different activities using information contained in a business process blueprint database (step 408). Furthermore, the computer identifies a subset of activities of the set of different activities to be performed by each respective member of the defined group, location of where the subset of activities is the be performed, and details regarding performance of the subset of activities for accomplishing different portions of the common task (step 410). Moreover, the computer identifies interdependencies between different subsets of activities corresponding to different members of the defined group based on the information contained in the business process blueprint database regarding the set of different activities for accomplishing the common task (step 412).

The computer also receives inputs from a personal monitoring system corresponding to each respective member of the defined group (step 414). The computer monitors quality and timing of performance of each different subset of activities corresponding to each different member of the defined group based on analysis of the inputs from the personal monitoring system of each respective member and identified interdependencies between the different subsets of activities (step 416). The computer makes a determination as to whether a problem exists with at least one of the quality and the timing of the performance of a particular subset of activities corresponding to a particular member of the defined group based on the monitoring (step 418).

If the computer determines that a problem does not exist with the quality or the timing of the performance of any subset of activities corresponding to the defined group based on the monitoring, no output of step 418, then the computer makes a determination as to whether performance of the common task been completed (step 420). If the computer determines that the performance of the common task has not been completed, no output of step 420, then the process returns to step 414 where the computer continues to receive inputs from personal monitoring systems of group members. If the computer determines that the performance of the common task has been completed, yes output of step 420, then the process terminates thereafter.

Returning again to step 418, if computer determines that a problem does exist with at least one of the quality and the timing of the performance of a particular subset of activities corresponding to a particular member of the defined group based on the monitoring, yes output of step 418, then the computer generates a mitigation strategy for the problem based on specific skill and location information contained in profiles of the members (step 422). Then, the computer sends a notification regarding the mitigation strategy to the set of devices corresponding to each target member of the defined group (step 424). Thereafter, the process returns to step 414 where the computer continues to receive inputs from personal monitoring systems of group members.

Figure 5:
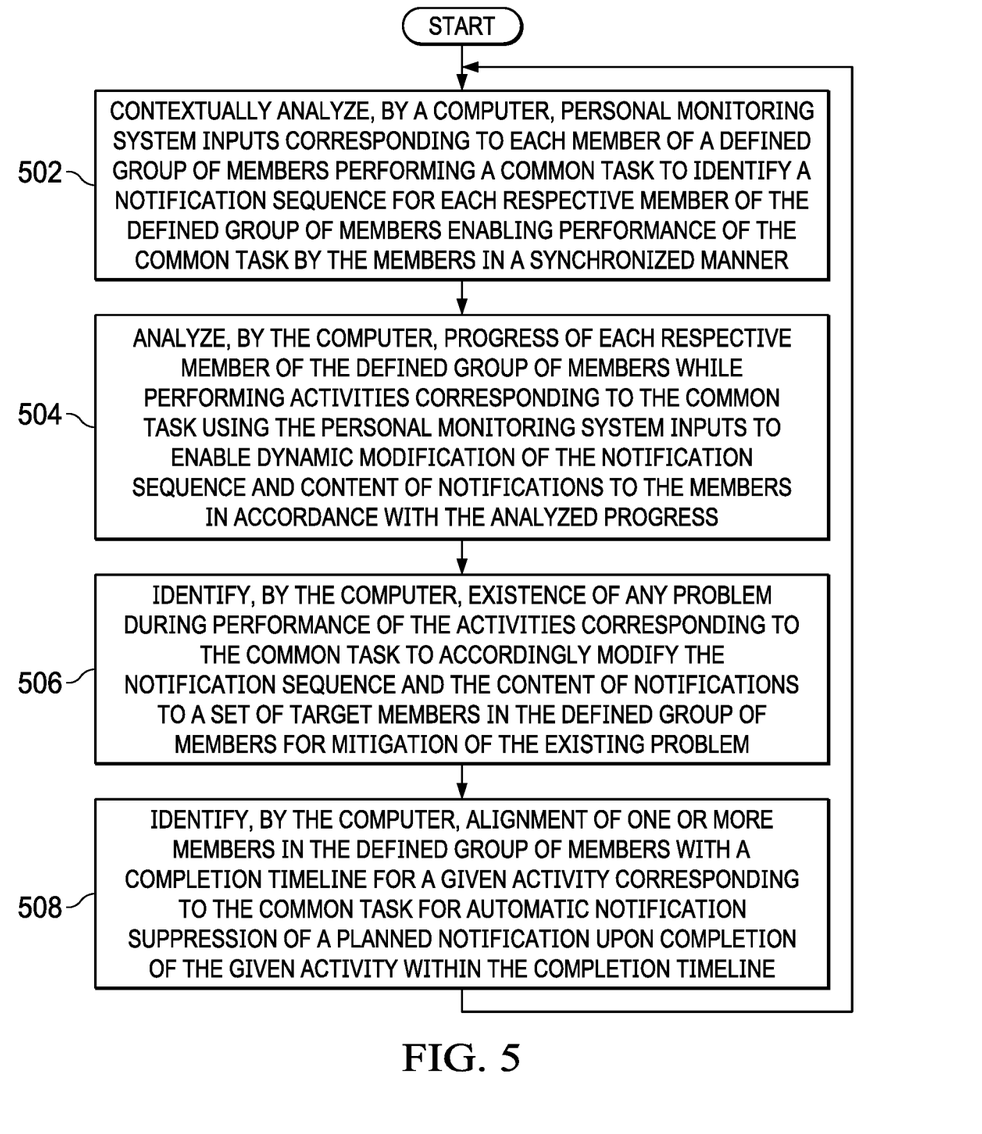
FIG. 5 is a flowchart illustrating a process for notification management in accordance with an illustrative embodiment.

With reference now to FIG. 5, a flowchart illustrating a process for notification management is shown in accordance with an illustrative embodiment. The process shown in FIG. 5 may be implemented in a computer, such as, for example, server 104 in FIG. 1, data processing system 200 in FIG. 2, or notification management server 302 in FIG. 3.

The process begins when the computer contextually analyzes personal monitoring system inputs corresponding to each member of a defined group of members performing a common task to identify a notification sequence for each respective member of the defined group of members enabling performance of the common task by the members in a synchronized manner (step 502). The computer analyzes progress of each respective member of the defined group of members while performing activities corresponding to the common task using the personal monitoring system inputs to enable dynamic modification of the notification sequence and content of notifications to the members in accordance with the analyzed progress (step 504). The computer identifies existence of any problem during performance of the activities corresponding to the common task to accordingly modify the notification sequence and the content of notifications to a set of target members in the defined group of members for mitigation of the existing problem (step 506). The computer identifies alignment of one or more members in the defined group of members with a completion timeline for a given activity corresponding to the common task for automatic notification suppression of a planned notification upon completion of the given activity within the completion timeline (step 508). Thereafter, the process returns to step 502 where the computer continues to contextually analyze personal monitoring system inputs corresponding to each member of a defined group of members.

Thus, illustrative embodiments of the present invention provide a computer-implemented method, computer system, and computer program product for managing notifications to a group of members performing a common task comprising multiple activities that are to be performed by different members of the group. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing group member notifications, the computer-implemented method comprising:
   contextually analyzing, by a computer, personal monitoring system inputs corresponding to each member of a defined group of members performing a common task to identify a notification sequence for each respective member of the defined group of members enabling performance of the common task by members in a synchronized manner;
   analyzing, by the computer, progress of each respective member of the defined group of members while performing activities corresponding to the common task using the personal monitoring system inputs to enable dynamic modification of the notification sequence and content of notifications to the members in accordance with the analyzed progress;
   identifying, by the computer, existence of any problem during performance of the activities corresponding to the common task to accordingly modify the notification sequence and the content of notifications to a set of target members in the defined group of members for mitigation of an existing problem; and
   identifying, by the computer, alignment of one or more members in the defined group of members with a completion timeline for a given activity corresponding to the common task for automatic notification suppression of a planned notification upon completion of the given activity within the completion timeline.

2. The computer-implemented method of claim 1 further comprising:
   identifying, by the computer, the members of the defined group; and
   identifying, by the computer, a set of devices corresponding to each respective member of the defined group for receiving notifications from the computer.

3. The computer-implemented method of claim 1 further comprising:
   identifying, by the computer, a set of different activities for accomplishing the common task and a sequence of the set of different activities using information contained in a business process blueprint database; and
   identifying, by the computer, a subset of activities of the set of different activities to be performed by each respective member of the defined group, location of where the subset of activities is the be performed, and details regarding performance of the subset of activities for accomplishing different portions of the common task.

4. The computer-implemented method of claim 1 further comprising:
   identifying, by the computer, interdependencies between different subsets of activities corresponding to different members of the defined group based on information contained in a business process blueprint database regarding a set of different activities for accomplishing the common task.

5. The computer-implemented method of claim 1 further comprising:
   receiving, by the computer, inputs from a personal monitoring system corresponding to each respective member of the defined group; and
   monitoring, by the computer, quality and timing of performance of each different subset of activities corresponding to each different member of the defined group based on analysis of the inputs from the personal monitoring system of each respective member and identified interdependencies between different subsets of activities.

6. The computer-implemented method of claim 1 further comprising:
   determining, by the computer, whether a problem exists with at least one of quality and timing of the performance of the activities by the defined group based on monitoring the personal monitoring system inputs corresponding to each member of the defined group.

7. The computer-implemented method of claim 6 further comprising:
   responsive to the computer determining that a problem does exist with at least one of the quality and the timing of the performance of the activities by the defined group based on the monitoring of the personal monitoring system inputs corresponding to each member of the defined group, generating, by the computer, a mitigation strategy for the problem based on specific skill and location information contained in profiles of members and sending, by the computer, a notification regarding the mitigation strategy to a set of devices corresponding to each target member of the defined group.

8. The computer-implemented method of claim 1, wherein the computer synchronizes the performance of the activities of the members of the defined group to increase performance of the common task by the members.

9. The computer-implemented method of claim 1, wherein a personal monitoring system of a member comprises a plurality of components selected from a group consisting of Internet of Things devices, wearable devices, image capturing devices, audio capturing devices, and home monitoring units.

10. A computer system for managing group member notifications, the computer system comprising:
a bus system;
a storage device connected to the bus system, wherein the storage device stores program instructions; and
a processor connected to the bus system, wherein the processor executes the program instructions to:
contextually analyze personal monitoring system inputs corresponding to each member of a defined group of members performing a common task to identify a notification sequence for each respective member of the defined group of members enabling performance of the common task by members in a synchronized manner;
analyze progress of each respective member of the defined group of members while performing activities corresponding to the common task using the personal monitoring system inputs to enable dynamic modification of the notification sequence and content of notifications to the members in accordance with the analyzed progress;
identify existence of any problem during performance of the activities corresponding to the common task to accordingly modify the notification sequence and the content of notifications to a set of target members in the defined group of members for mitigation of an existing problem; and
identify alignment of one or more members in the defined group of members with a completion timeline for a given activity corresponding to the common task for automatic notification suppression of a planned notification upon completion of the given activity within the completion timeline.

11. The computer system of claim 10, wherein the processor further executes the program instructions to:
identify the members of the defined group; and
identify a set of devices corresponding to each respective member of the defined group for receiving notifications from the computer system.

12. The computer system of claim 10, wherein the processor further executes the program instructions to:
identify a set of different activities for accomplishing the common task and a sequence of the set of different activities using information contained in a business process blueprint database; and
identify a subset of activities of the set of different activities to be performed by each respective member of the defined group, location of where the subset of activities is the be performed, and details regarding performance of the subset of activities for accomplishing different portions of the common task.

13. The computer system of claim 10, wherein the processor further executes the program instructions to:

identify interdependencies between different subsets of activities corresponding to different members of the defined group based on information contained in a business process blueprint database regarding a set of different activities for accomplishing the common task.

14. The computer system of claim 10, wherein the processor further executes the program instructions to:
receive inputs from a personal monitoring system corresponding to each respective member of the defined group; and
monitor quality and timing of performance of each different subset of activities corresponding to each different member of the defined group based on analysis of the inputs from the personal monitoring system of each respective member and identified interdependencies between different subsets of activities.

15. A computer program product for managing group member notifications, the computer program product comprising a computer readable storage medium having program instructions embodied therewith, the program instructions executable by a computer to cause the computer to perform a method comprising:
contextually analyzing, by the computer, personal monitoring system inputs corresponding to each member of a defined group of members performing a common task to identify a notification sequence for each respective member of the defined group of members enabling performance of the common task by members in a synchronized manner;
analyzing, by the computer, progress of each respective member of the defined group of members while performing activities corresponding to the common task using the personal monitoring system inputs to enable dynamic modification of the notification sequence and content of notifications to the members in accordance with the analyzed progress;
identifying, by the computer, existence of any problem during performance of the activities corresponding to the common task to accordingly modify the notification sequence and the content of notifications to a set of target members in the defined group of members for mitigation of an existing problem; and
identifying, by the computer, alignment of one or more members in the defined group of members with a completion timeline for a given activity corresponding to the common task for automatic notification suppression of a planned notification upon completion of the given activity within the completion timeline.

16. The computer program product of claim 15 further comprising:
identifying, by the computer, the members of the defined group; and
identifying, by the computer, a set of devices corresponding to each respective member of the defined group for receiving notifications from the computer.

17. The computer program product of claim 15 further comprising:
identifying, by the computer, a set of different activities for accomplishing the common task and a sequence of the set of different activities using information contained in a business process blueprint database; and
identifying, by the computer, a subset of activities of the set of different activities to be performed by each respective member of the defined group, location of where the subset of activities is the be performed, and details regarding performance of the subset of activities for accomplishing different portions of the common task.

18. The computer program product of claim 15 further comprising:
identifying, by the computer, interdependencies between different subsets of activities corresponding to different members of the defined group based on information contained in a business process blueprint database regarding a set of different activities for accomplishing the common task.

19. The computer program product of claim 15 further comprising:
receiving, by the computer, inputs from a personal monitoring system corresponding to each respective member of the defined group; and
monitoring, by the computer, quality and timing of performance of each different subset of activities corresponding to each different member of the defined group based on analysis of the inputs from the personal monitoring system of each respective member and identified interdependencies between different subsets of activities.

20. The computer program product of claim 15 further comprising:
determining, by the computer, whether a problem exists with at least one of quality and timing of the performance of the activities by the defined group based on monitoring the personal monitoring system inputs corresponding to each member of the defined group.

* * * * *